United States Patent
Kors et al.

(10) Patent No.: US 10,121,348 B2
(45) Date of Patent: Nov. 6, 2018

(54) METHOD OF DATA COMMUNICATION WITH MULTIPLE LIQUID LEVEL DETECTION SENSORS CONNECTED TO A CENTRAL PROCESSING UNIT, AND LIQUID LEVEL DETECTION SYSTEM

(71) Applicant: OPW Fluid Transfer Group Europe B.V., Nieuw-Vennep (NL)

(72) Inventors: Leonardus Alexius Kors, Nieuw-Vennep (NL); Jan Cornelis De Boer, Nieuw-Vennep (NL); Arie Pieter Wilhelmus Van Der Maarl, Nieuw-Vennep (NL)

(73) Assignee: OPW Fluid Transfer Group Europe B.V., Nieuw-Vennep (NL)

( * ) Notice: Subject to any disclaimer, the term of this patent is extended or adjusted under 35 U.S.C. 154(b) by 310 days.

(21) Appl. No.: 14/764,208

(22) PCT Filed: Jan. 30, 2014

(86) PCT No.: PCT/NL2014/050050
§ 371 (c)(1),
(2) Date: Jul. 29, 2015

(87) PCT Pub. No.: WO2014/120006
PCT Pub. Date: Aug. 7, 2014

(65) Prior Publication Data
US 2015/0379854 A1     Dec. 31, 2015

(30) Foreign Application Priority Data

Jan. 30, 2013  (NL) .................................... 2010202

(51) Int. Cl.
*G08B 21/18* (2006.01)
*H04Q 9/00* (2006.01)

(52) U.S. Cl.
CPC ............ *G08B 21/182* (2013.01); *H04Q 9/00* (2013.01)

(58) Field of Classification Search
None
See application file for complete search history.

(56) References Cited

U.S. PATENT DOCUMENTS

| | | | | |
|---|---|---|---|---|
| 5,353,009 | A * | 10/1994 | Marsh | G06F 12/0676 340/3.32 |
| 2010/0185334 | A1 | 7/2010 | Trottier et al. | |
| 2016/0378153 | A1 * | 12/2016 | Kelly | G06F 1/266 710/313 |

FOREIGN PATENT DOCUMENTS

| | | |
|---|---|---|
| EP | 2040047 A1 | 3/2009 |
| WO | 2008/076720 A2 | 6/2008 |

* cited by examiner

*Primary Examiner* — Firmin Backer
*Assistant Examiner* — Shawna M Kingston
(74) *Attorney, Agent, or Firm* — Hoffmann & Baron, LLP

(57) ABSTRACT

A method of data communication with a selected sensor of multiple liquid level detection sensors connected to a central processing unit includes the steps of: a) transmitting by the central processing unit directly or indirectly a communication signal to the selected sensor of the series of multiple sensors, b) upon receipt of the communication signal by the selected sensor, processing the communication signal in the selected sensor. A liquid level detection system, in particular a liquid overfill prevention system for multi compartment liquid tank trucks, includes two or more liquid level detection sensors, preferably arranged in series, and a central processing unit, where at least one of the two or more sensors includes a sensor processing unit comprising a storage unit.

22 Claims, 2 Drawing Sheets

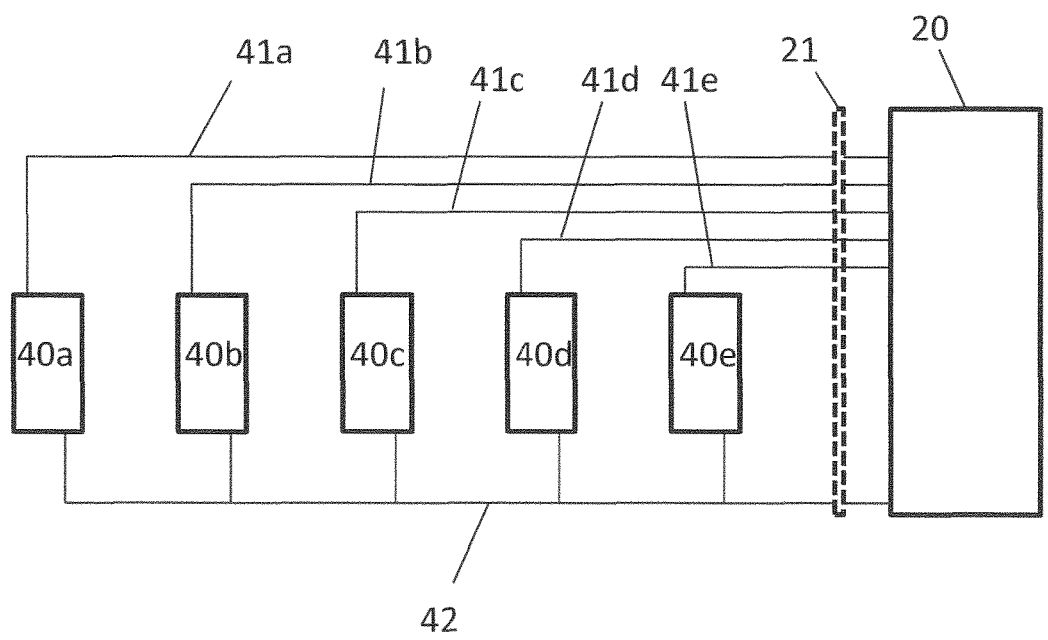

METHOD OF DATA COMMUNICATION WITH MULTIPLE LIQUID LEVEL DETECTION SENSORS CONNECTED TO A CENTRAL PROCESSING UNIT, AND LIQUID LEVEL DETECTION SYSTEM

CROSS-REFERENCE TO RELATED APPLICATIONS

This application is the National Stage of International Application No. PCT/NL2014/050050 filed Jan. 30, 2014, which claims the benefit of Netherlands Application No. NL 2010202, filed Jan. 30, 2013, the contents of which is incorporated by reference herein.

FIELD OF THE INVENTION

The present invention relates to a method of data communication with multiple liquid level detection sensors connected to a processing unit. The present invention also relates to a liquid level detection system configured to carry out such method.

BACKGROUND OF THE INVENTION

Liquid level detection sensors are used to determine a liquid level in a container, in particular the compartment of a liquid tank truck. A liquid detection sensor may for example be arranged at a top side of the interior of the compartment to detect the presence of liquid at this level. The sensor may be used to prevent overfilling of the compartment by stopping filling of the compartment as soon as the liquid level has reached the sensor.

The liquid detection sensor may for example be an optical liquid detection sensor using a light beam to determine the presence of liquid on a liquid contact surface formed by a prism element of the sensor.

The optical liquid level detection sensor comprises a light source for emitting a light beam, a prism element forming liquid contact surface, and a light detector. The light source is arranged to emit a light beam towards the liquid contact surface, which liquid contact surface reflects or transmits the light beam in dependence of liquid being present on the liquid contact surface. The light detector is arranged to receive the light beam after reflection on the liquid contact surface. When the light beam is transmitted through the liquid contact surface due to the presence of liquid on this contact surface, the light beam will no longer reach the light detector. As a result, the presence of liquid on the liquid contact surface may be determined in dependence of the amount of light received by the light detector.

US 2010/0185334 discloses a liquid overfill detection and control system. The system comprises multiple sensors and a controller. The sensors are connected in series to a central processing unit configured to control filling of the compartments of a liquid tank truck. A diagnostic line is connected in parallel to each of the sensors and the controller. Each of the sensors is placed in a liquid compartment to detect whether the liquid level has reached the respective sensor. When one of the sensors detects the presence of liquid at the liquid contact surface filling of the compartments is stopped.

The diagnostic line connected to each of the sensors provides a diagnostic signal indicative of the number of sensors that generate an output pulse, i.e. the number of sensors of which the liquid contact surface is not immersed in liquid.

SUMMARY OF THE INVENTION

The aim of the invention is to provide a method to obtain information from or send information to multiple liquid level detection sensors connected to a central processing unit.

The present invention provides a method of data communication with a selected sensor of multiple liquid level detection sensors connected to a central processing unit, the method comprising the steps of:

a) transmitting by the central processing unit directly or indirectly a communication signal to the selected sensor of the series of multiple sensors, b) upon receipt of the communication signal by the selected sensor, processing the communication signal in the selected sensor.

This method is in particular intended to be used in a sensor arrangement wherein the communication signal is transmitted over one or more cables also used for operating signals. This has the advantage that no separate cables have to be provided for data communication.

The data communication method may be applied in a liquid overfill prevention system for multi-compartment liquid tank trucks, wherein each of the multiple liquid level detection sensors is arranged in a truck compartment. In such liquid overfill prevention system the liquid level detection sensors are preferably designed as overfill prevention sensor, according to NEN-EN 13922, connected with a 5-wire system or 2-wire system, wherein the 5-wire system or 2-wire system is both used for operational communication, and, in accordance with the present invention for data communication.

It is remarked that data used in data communication is other data than the operating signals used for operation of the liquid level detection sensors. Typically, the operating signals used for operation of the liquid level detection sensors will be single pulse signals, while the data communication signal will have a more complex structure. The data communication signal may be a digital communication signal. Data communication may relate to a specific sensor.

The operating signal is normally a signal, in particular a pulse signal, representative for the detection of liquid by the liquid level sensor, e.g. transmitting a pulse means no liquid detected, and not transmitting a pulse means liquid detected, or vice versa.

It is remarked that an operating pulse signal having a specific variable characteristic, wherein the value of the variable characteristic is used to address a specific one of multiple sensors to request a data request response signal of this sensor is also regarded to be a data communication signal in the context of this application. The variable characteristic of the pulse signal may for example be the frequency of the pulse signal.

The data communication signal may be used to obtain identification of the liquid level sensors, for example by a serial number. This identification can be used to determine any change in the set-up of the sensor arrangement, and/or to determine whether only sensors or also sensor dummies are present in the sensor setup.

In an embodiment, a sensor capable of data communication is switchable between an operational mode for operating the sensor and a communication mode for data communication with the central processing unit.

When sensor cabling is used for data communication as well as other tasks, for example when the five wire sensor arrangement is used for operation and data communication, the sensor may advantageously be switchable between an operational mode in which the sensors are operated in a conventional way and a communication mode in which the sensor is able to receive and send allocation and communication signals.

The switching between the modes may be used to avoid that an operational sensor signal is handled as a communication signal or that a communication signal is handled as an operating signal.

When the central processing unit knows when the sensor susceptible for data communication, for example a communication time period after a predefined period of time after power up, the central processing unit can be configured to send communication signals during the communication time period.

In another embodiment, the central processing unit may be configured to transmit a mode switching signal to the sensors to switch the sensors from an operational mode to a communication mode. The mode switching signal is preferably a signal which will not occur during normal operation or during data communication so that the sensors can reliably switch between operational mode and communication mode.

In an embodiment, the method comprises the steps of:
a) transmitting by the central processing unit a communication signal comprising an addressing value corresponding to an addressing value of the selected sensor to one or more of the series of multiple sensors,
b) upon receipt of the communication signal by one of the multiple sensors,
   comparing by the respective one sensor the addressing value of the communication signal with an addressing value stored in the one sensor, and
   when the addressing value of the communication signal and the stored addressing value correspond, determining that the one sensor is the selected sensor and processing the communication signal in the selected sensor.

Each of the multiple liquid level detection sensors connected to a central processing unit has an addressing value which is unique for the sensor within the group of multiple sensors. This addressing value can be a unique value of the sensor which is entered into the central processing unit. The addressing value can also be given by the central processing unit to the respective sensor during an allocation procedure, for example during initialization of the sensor arrangement.

By using the addressing value in a communication signal to one or more sensors including the selected sensor, the selected sensor may determine that the communication signal is intended to be processed by this selected sensor, while the other sensors may determine that the communication signal is not intended to be processed by these other sensors.

In an embodiment, the multiple liquid level detection sensors are connected in series to the central processing unit, the method comprising the steps of:
a) transmitting by the central processing unit a communication signal comprising an addressing value corresponding to an addressing value of the selected sensor to the first sensor of the series of multiple sensors,
b) upon receipt of the communication signal by one of the multiple sensors,
   comparing by the respective one sensor the addressing value of the communication signal with an addressing value stored in the one sensor, and
   when the addressing value of the communication signal and the stored addressing value correspond, determining that the one sensor is the selected sensor and processing the communication signal in the selected sensor, or
   when the addressing value of the communication signal and the stored addressing value do not correspond, transmitting the communication signal with the addressing value to a next sensor of the series of multiple sensors,
c) repeating step b) until the communication signal is processed by the selected sensor.

By sending from the central processing unit a communication signal having an addressing value associated with a selected sensor, i.e. a selected one of the multiple sensors with which data communication is desired, to the series of sensors, the sensors will pass the communication signal on to the next sensor as long as the addressing value of the communication signal does not correspond with the addressing value stored in the sensor which received the communication signal.

When the addressing value of the communication signal and the addressing value stored in a sensor correspond, the communication signal has reached the selected sensor and the communication signal can be processed by the selected sensor.

It is remarked that correspondence of the addressing value of the communication signal and the addressing value stored in the sensor does not mean that these value have to be the same. The two address values correspond when the sensor determines that the address value of the communication signal matches/belongs to the address value of the sensor, and, thus, that the communication signal is intended to be processed by this sensor.

The central processing unit may be any processing unit capable of sending and receiving communication signals. Such central processing unit may for example be part of a truck tester, rack monitor or load monitor, test fixture or another master interface. In a liquid level detection system configured to prevent overfilling of the compartments of a liquid tank truck, the central processing unit may be any processing unit controlling filling of the truck, such as a rack monitor or load monitor connected to the sensors during filling of the compartments of the liquid tank truck.

The sensor to be used for the method of the invention may be based on any sensor suitable to detect a liquid level, in particular an optical liquid level detection sensor configured to be connected in series in a five wire sensor arrangement, as for instance described in US 2010/0185334, the contents of which are herein incorporated in its entirety by reference. To make data communication possible, such sensor may, in line with the invention, be provided with a sensor processing unit and when needed a storage unit in which data such as an addressing value can at least temporarily be stored.

In an embodiment, the communication signal comprises a data request for requested data, and the step of processing the communication signal in the one sensor comprises sending a data request response signal comprising the requested data to the central processing unit. The data communication of the invention may be used to obtain relevant information from a sensor. This information is obtained by sending a data request to a specific sensor. The sensor may send the data to the central processing unit using a data request response signal.

The data request may for example request the specific sensor to send a data request response signal comprising any relevant information available in the sensor, such a serial number of the sensor, the total number of times the sensor has detected liquid, historical operational data, maintenance data, sensor calibration data which was stored in the sensor after one or more calibrations, sensor location history, etc. The requested data may be real-time information or information stored in the sensor.

The historical operational data may comprise information on the operation of the sensor, and maintenance data on the maintenance history of the sensor.

The sensor location data may comprise information on the actual and previous locations of the sensor, for example a table indicating which time intervals the sensor was mounted in a specific compartment of a specific liquid tank truck.

The requested data may also comprise a maintenance interval counter. Such maintenance interval counter may for instance count every time the sensor is connected to a rack monitor or other central processing unit. This counter may be reset to zero every time the sensor detects liquid since this indicates that the sensor still properly functions. Further, a maximum number for the maintenance interval counter may be set. When the maintenance interval counter reaches this maximum number, it may no longer be used until maintenance is performed. In such case that the sensor may no longer be used, it may be set to signal that the liquid contact surface is in contact with liquid even when this is not the case. By using a maintenance interval counter in this way, regular maintenance of the sensor is forced.

It is remarked that in an alternative embodiment the communication signal may be a general communication signal with a data request for each sensor, and in response to the communication signal, each sensor may send a data request response signal comprising the requested data and a sensor identification, for example an addressing value.

In an embodiment, each sensor comprises a power input connection and a ground connection to provide power to the sensor, a pulse input connection, a pulse output connection and a diagnostic connection, wherein the multiple sensors are connected in series via the pulse input connection and the pulse output connection, and wherein the multiple sensors are connected in parallel to the central processing unit via the diagnostic connection, and wherein the communication signal is received at the pulse input connection and transmitted at the pulse output connection, and wherein the data request response signal is transmitted at the diagnostic connection.

In an embodiment, a so called five wire sensor arrangement is used. In such sensor arrangement the sensors are serially connected to each other by connecting the pulse output of a sensor to the pulse input of a next sensor. The sensors are further in parallel connected to a power line, a ground line and a diagnostic line. Since the pulse input and pulse output are connected in series to the central processing unit, such sensor arrangement is regarded to be an arrangement with multiple liquid level detection sensors connected in series to a central processing unit.

In an embodiment of the invention, this sensor arrangement, which, as such, is known, see for instance US 2010/0185334, is also used for data communication. This has the advantage that no separate wiring for data communication has to be provided.

In an embodiment, the communication signal comprises sensor setting data, and wherein the step of processing the communication signal in the one sensor comprises storing the sensor setting data in the one sensor.

Instead of sending a data request to the sensor, the data communication between central processing unit and the respective sensor can also be used to send data to the sensor. For example, the communication signal may comprise sensor setting data, which can be sent to the sensor to change the settings of the sensor. The sensor setting data may comprise setting data to adjust sensitivity to ambient light or intensity of a light emitter of said sensor. Any other sensor setting may also be adjusted. Other data may also be sent to the sensor, such as calibration data, information on the compartment and the liquid tank truck on which the sensor is mounted, etc.

It is remarked that in an alternative embodiment the communication signal may be a general communication signal with data for each sensor, whereby each sensor processes the same set of data sent to the processing unit.

To use the data communication described above, the sensor used for data communication has an addressing value so that the sensor can assess whether the sensor should pass the communication signal to a next sensor or process the information itself.

The addressing value may for instance be the number in the sequence of sensors and/or the compartment number of the compartment in which the respective sensor is mounted. Any other identification label, i.e. addressing value, unique for the location of the sensor in the series of multiple sensors may also be used.

This addressing value may be stored in the sensor when it is mounted on a truck compartment or other location, and the processing unit may be programmed to know which sensor with addressing value is mounted in which compartment.

However, the method of the invention may also comprise the step of allocating an addressing value to one or more of the multiple sensors to determine a location of the one or more sensors. This allocation step may be performed every time the sensors are connected to a central processing unit or every time one or more of the sensors are mounted at a new location.

In an embodiment, the step of allocating an addressing value to the sensors comprises:

d) transmitting by the central processing unit an addressing signal having an addressing value to a first sensor of the series of multiple sensors, e) upon receipt of the addressing signal by one of the multiple sensors, by the respective one sensor,
  adapting the addressing value to a further addressing value,
  storing the addressing value or the further addressing value in the sensor, and
  transmitting the addressing signal with the further addressing value to a next sensor of the series of multiple sensors, and f) repeating step e) for each sensor receiving the addressing signal and capable of data communication.

In an embodiment, the addressing value is an integer value, for example the compartment number, and the step of adapting the addressing value comprises adding a fixed number to the integer value. For example, the first sensor in the first compartment receives addressing value '1' and adds 1 to send addressing value '2' to the second sensor in the second compartment. The second sensor receives addressing value '2' and adds 1 to send addressing value '3' to the third sensor in the third compartment, etc. In another embodiment, the first sensor may receive an addressing signal with an addressing value, and the sensor may adapt this addressing value before storing it and transmitting it to the next sensor.

In an embodiment, the allocating step further comprises transmitting by one sensor an acknowledgement signal to the central processing unit to acknowledge receipt and/or transmission of the addressing signal. The acknowledgment signal confirms to the central processing unit each sensor successfully addressed.

In an embodiment, the central processing unit may be configured to count the number of received acknowledgement signals representing the number of successfully addressed sensors. Each time a sensor is successfully allocated a addressing value, an acknowledge signal, for example by means of sending its own address or another specific signal, is sent to the central processing unit By counting the number of acknowledgement signals received by the central processing unit, the number of successfully addressed sensors may be determined. This may for example be advantageous when one of the sensors is not capable of data communication. In such case, this sensor will not pass on the addressing signal and, as a result, the central processing unit will not receive the addressing signal via the pulse output connection of the last sensor of the series of sensors. By counting the sensors, the central processing unit may determine which sensors can be used for data communication.

In an embodiment, wherein each sensor comprises a power input connection and a ground connection to provide power to the sensor, a pulse input connection, a pulse output connection and a diagnostic connection, wherein the multiple sensors are connected in series via the pulse input connection and the pulse output connection, and wherein the multiple sensors are connected in parallel to the central processing unit via the diagnostic connection, and wherein the addressing signal is received at the pulse input connection and transmitted at the pulse output connection, and wherein the acknowledgement signal is transmitted at the diagnostic connection.

In a five wire sensor arrangement, the step of allocating can be carried out by passing on the addressing signal via the impulse input and impulse output lines, and by sending, when desired, acknowledgment signals via the diagnostic line.

In an embodiment, the central processing unit is configured to send an addressing signal after a predefined period of time after power up, and wherein each of the one or more sensors is switched to a communication mode at the end of the predefined period of time in order to receive and process the addressing signal.

In an embodiment, the method of the invention comprises the step of counting the number of sensors in the series of multiple sensors capable of data communication, the counting comprising:

i) transmitting by the central processing unit or the first sensor a counting signal to a sensor of the series of multiple sensors, ii) upon receipt of the counting signal by one of the multiple sensors, by the respective one sensor, transmitting the counting signal to a next sensor of the series of multiple sensors and transmitting an acknowledgement signal to the central processing unit, wherein the sensors capable of data communication are configured to transmit the counting signal and the acknowledgement signal with a delay, iii) repeating step ii) for each sensor receiving the counting signal, iv) determining by the central processing unit on the basis of the number and timing of acknowledgement signals received by the central processing unit, the number of sensors capable of data communication in the series of multiple sensors.

A conventional sensor not capable of data communication will, upon receipt of a pulse input signal, substantially directly or with a small delay transmit the pulse signal to the next sensor and also substantially directly or with a small delay transmit an acknowledgment signal to the central processing unit. By configuring the sensors capable of data communication to transmit the counting signal and the acknowledgement signal only after a predetermined delay noticeably larger than a delay in transmission of conventional sensors, the number of sensors capable of data communication may be determined by the number and timing of the acknowledgement signals received by the central processing unit.

In an embodiment, the communication signal is an operating pulse signal having a variable characteristic, wherein a value of the variable characteristic is used as an addressing value to address a specific one of multiple sensors to request a data request response signal of this specific one sensor. The use of such operating pulse signal having a variable characteristic has the advantage that, for example in a five-wire system, the operating pulse signal can be used as a data communication signal to trigger a data request response signal from a selected sensor without interfering with the operational function of the operating signal. This means that the data can be requested during normal operation of the sensor and sensor system, i.e. during the operational mode in which a operating signal is propagated through the sensor system to detect whether at least one of the sensors of the sensor system detects the presence of liquid.

In an embodiment the frequency of the operating pulse signal is used as variable characteristic may be used as addressing value. However, any other variable characteristic of which variation within a certain bandwidth does not interfere with the working principle of the sensor system may also be used.

In an embodiment the frequency of the pulse operating signal may be varied within a certain bandwidth, without interfering normal operation of the sensor system. This is possible as the frequency of subsequent pulses as such is not used in the normal operation of the sensor system, i.e. for the detection of liquid by the liquid level sensors. By using different frequencies in the operating pulse signal, different sensors can be addressed when each sensor knows its addressing value, in this case a addressing frequency associated with the specific sensor. The frequency associated with each sensor may be stored in the sensor, or be allocated in an addressing protocol as described hereinabove. The frequency may for example be determined by the sensor on the basis of the integer value allocated to the sensor in an integer value addressing protocol, wherein the sensor has a table comprising a relationship between integer value addressing values and associated operating pulse frequencies.

In a five-wire system the sensor may be configured to send a data request response signal in response to the communication signal over the diagnostic connection. Since during normal operation, at least as long no liquid is detected by the sensors, the diagnostic line is not used, the requested data may be sent over the diagnostic line to the central processing device.

In an embodiment, the data request response signal comprises a pointer value, requested data associated with the pointer value and a cyclic redundancy check (CRC).

The invention further provides a liquid level detection system, in particular a liquid overfill prevention system for multi compartment liquid tank trucks, comprising two or more liquid level detection sensors arranged in series, and a central processing unit, wherein each of the two or more sensors comprises a sensor processing unit comprising a storage unit, wherein the central processing unit and the sensor processing units are configured to perform the method of any of the embodiments of the present invention.

The inventions also provides a liquid level detection sensor comprising a sensor processing unit, wherein said sensor processing unit is configured to carry out the method of any of the embodiments of the present invention.

The invention also provides a method of operating multiple liquid level detection sensors, in particular multiple liquid level detection sensors of a liquid overfill prevention system of a multi compartment liquid tank truck, comprising the steps of:
connecting the sensors to a central processing unit,
sending from the central processing unit directly or indirectly an operating signal to the sensors to determine if at least one of the sensors is in contact with liquid, and
carrying out a data communication method according to any of the embodiments of the present invention.

In a five wire system with multiple sensors in series, the sending of an operating signal may be as follows. The operating signal is sent to a first sensor of the series of sensors. Each sensor, that detects no liquid on the liquid contact surface, will forward the operating signal to the next sensor in the series of sensors, and the last sensor will forward the operating signal back to the central processing unit.

If the operating signal from the last sensor is received by the central processing unit, the central processing unit determines that all sensors are connected and that none detects liquid on the liquid contact surface. However, if no operating signal is received by the central processing unit, the central processing unit determines that either at least one sensor of the sensors is disconnected or that, in at least one compartment, the liquid has reached the liquid contact surface of that sensor.

The invention may also provide a computer program adapted to perform the method of any of the embodiments of the present invention and/or a computer readable storage medium comprising such computer program, said program comprising instructions to cause a central processing unit and one or more sensor processing units to carry out the steps of any of the method embodiments of the present invention.

BRIEF DESCRIPTION OF THE DRAWINGS

An embodiment of the invention will now be explained, by way of example only, whereby reference will be made to the accompanying drawings, in which:

FIG. 3 shows schematically five sensors connected in a 2-wire arrangement to a central processing unit.

DETAILED DESCRIPTION OF THE INVENTION

Figure 1:
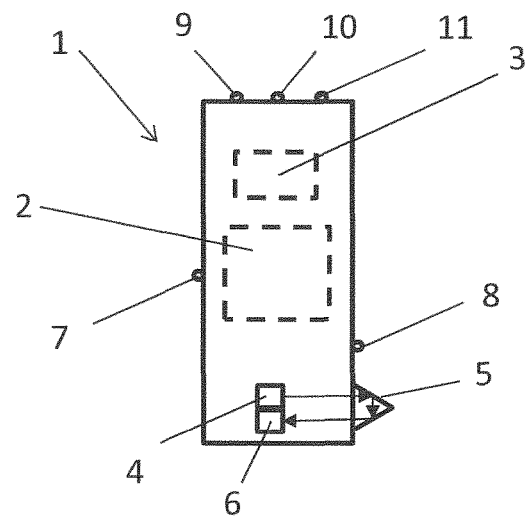
FIG. 1 shows a schematic view of an embodiment of a liquid level detection sensor according to the invention

FIG. 1 shows schematically a liquid level detection sensor, generally indicated by reference numeral 1. The sensor 1 comprises a sensor processing unit 2, for example a processing device and a storage unit 3, for example a hard disk drive or a solid state drive.

The sensor 1 further comprises a light source 4, a prism element 5 and a light detector 6. The light source 4 is configured to emit a light beam towards the prism element 5. The prism element 5 comprises two liquid contact surfaces. The liquid contact surfaces are outer surfaces of the prism element 5 which come into contact with liquid when the sensor 1 is immersed in liquid. The light detector 6 is arranged to receive the light beam after reflection on the liquid contact surfaces. The liquid contact surfaces only reflect the light beam when no liquid is present on the liquid contact surfaces. In case liquid is present on a liquid contact surface, this liquid contact surface will transmit the light beam and the light beam will no longer reach the light detector.

As a result, the presence of liquid on the liquid contact surface may be determined in dependence of the amount of light received by the light detector.

Sensors using such measurement principle are for example disclosed in WO 2008/076720 and US 2010/0185334.

These sensors are part of a sensor arrangement of a liquid overfill prevention system designed in accordance with NEN-EN 13922 "*Tanks for transport of dangerous goods—Service equipment for tanks—Overfill prevention systems for liquid fuels*", and connected with a 5-wire system. The 5-wire system is used for operational communication, and, in accordance with the present invention for data communication.

The sensor processing unit 2, the storage unit 3, the light source 4, and the light detector 6 may be arranged on a single printed circuit board to obtain a reliable and efficient construction.

The sensor 1 is of a five-wire type having a pulse input connection 7, a pulse output connection 8, a power connection 9, a ground connection 10 and a diagnostic connection 11. The pulse input connection 7 and pulse output connection 8 are configured to connect multiple sensors serially, i.e. in a daisy chain. The power connection 9 and ground connection 10 are provided to supply power to the sensor 1. The diagnostic connection 11 may be used to connect the sensor to a diagnostic line.

Figure 2:
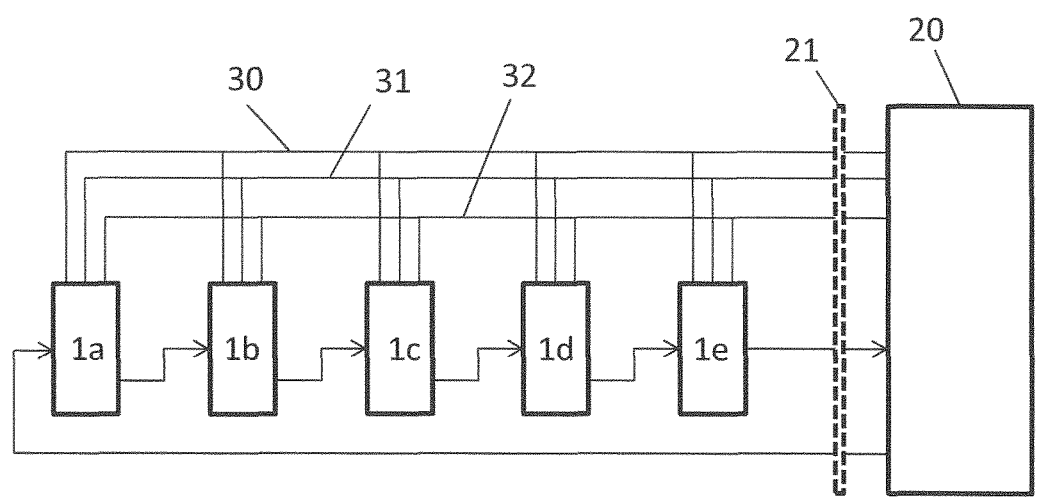
FIG. 2 shows schematically five sensors of FIG. 1 connected, in a 5-wire arrangement, to a central processing unit.

FIG. 2 shows five sensors 1a-1e, each mounted in a compartment of a five compartment liquid tank truck (not shown). Each of the sensors 1a-1e is arranged in an upper part of the interior of a compartment to determine whether the compartment is filled up to a certain liquid level.

The sensor arrangement is connected by a releasable connection 21 to a central processing unit 20. The connection 21 may for instance be formed by a connection plug connected to the central processing unit 21 plugged in a connection socket mounted on the liquid tank truck, in particular a 10-pin socket (EuroLINK) connection according to EN 13922.

The sensors 1a-1e are connected in daisy chain, in which a pulse outlet connection 8 of a sensor is connected to a pulse input connection 7. Only the pulse input connection 7 of the first sensor 1a and the pulse outlet connection 8 of the last sensor 1e are connected by releasable connection 21 to the central processing unit 20.

Each of the power connections of the sensors 1a-1e are connected to a power line 30 to provide the sensors 1a-1e with power and each of the ground connections are connected to a grounding line 31.

During normal operation where the sensors are configured to detect a liquid level in the tank compartment, there is no data communication between the central processing unit 20 and the sensors 1a-1e. In this normal operation the sensors are in operational mode, i.e. the sensors 1a-1e are configured to process incoming signals to determine whether one of the liquid contact surfaces of the sensors 1a-1e detects liquid on its surface.

In this normal operation, i.e. operational mode, a pulse generator in the central processing unit 20 sends a pulse to the pulse input connection of the first sensor 1a and the central processing unit 20 looks for a pulse return from the pulse output of the last sensor 1e. Each of the sensors 1a-1e that receives the pulse at the respective pulse input connection will transmit the pulse via the pulse output connection, when no liquid is detected on the liquid contact surface.

If the return pulse is detected, the central processing unit 20 determines that all sensors 1a-1e are connected and that none of the compartments are overfilled, i.e. none of the sensors 1a-1e detects liquid on the liquid contact surface. However, if there is no return pulse detected, the central processing unit 20 determines that either at least one sensor of the sensors 1a-1e is disconnected or that, in at least one compartment, the liquid has reached the liquid contact surface of that sensor, and therefore terminates the filling process for all compartments.

A diagnostic line 32 that is in parallel connected to each of the sensors 1a-1e is also included in the sensor arrangement. Each sensor 1a-1e that transmits the pulse to the next sensor also transmits a diagnostic signal through the diagnostic line 32. Since the diagnostic line is connected in parallel to the sensors 1a-1e, an intensity or other value of the diagnostic signal may change in dependence of the number of sensors 1a-1e sending a diagnostic signal. Therefore, the signal received by the central processing unit 20 over the diagnostic line 32 provides an indication of the number of sensors that transmit an output pulse.

The diagnostic signal may for example be based on a voltage. The voltage level is indicative of the number of "active" sensors, i.e. sensors sending a diagnostic signal. A lookup table module may be accessed by the central processing unit 20 for correlating the detected voltage level on the diagnostic line to a value indicative of a number of active sensors.

The present invention proposes to carry out data communication between the sensors 1a-1e and the central processing unit 20.

The data communication can be used to exchange information between the central processing unit 20 and each of the sensors 1a-1e. It may be advantageous to configure the sensors 1a-1e to switch between operational mode and communication mode, in particular when the same cabling, for example the five wire sensor arrangement described above, is used for operation and data communication. This avoids that an operational sensor signal is handled as a communication signal or that a communication signal is handled as an operational sensor signal.

The central processing unit 20 has to be configured to know or recognize when the sensor is in communication mode, For example, the sensors 1a-1e may be switched to communication mode during a data communication time period after a predefined period of time after power up. The central processing unit 20 can be configured to start data communication within this data communication time period.

Also, the central processing unit 20 may be configured to transmit a communication mode signal to the sensors 1a-1e which communication mode signal will not occur during normal operation, to switch the sensors from operational mode to communication mode.

To perform data communication, the central processing unit 20 has to know the location of each of the sensors 1a-1e.

The location of the sensors 1a-1e may be known in the central processing unit 20, but preferably the central processing unit 20 carries out an allocation step to allocate an addressing value to each of the sensors 1a-1e, for example during an initialization phase after the sensor arrangement has been connected to the central processing unit 20.

When desired, the number of sensors 1a-1e capable of data communication may be counted before allocation of the sensors 1a-1e is started.

This counting can be performed as follows. The central processing unit 20 or the first sensor 1a transmits a counting signal to the pulse input connection of the next of multiple sensor 1a-1e. Upon receipt of the counting signal by this sensor, that sensor will transmit, with a predetermined delay, the counting signal from the pulse output connection of the sensor to the pulse input connection of the next sensor in the daisy chain. Also, each sensor 1a-1e which transmits the counting signal to the next sensor will transmit an acknowledgement signal to the central processing unit 20. The central processing unit 20 can count on the basis of the number and timing of acknowledgement signals received by the central processing unit 20, the number of sensors of the multiple sensors 1a-1e capable of data communication.

To allocate each of the sensors 1a-1e, an addressing value indicative of the location of the respective sensor can be allocated to each of the sensors. In the allocation step, the central processing unit 20 transmits an addressing signal having an addressing value to the first sensor 1a. The addressing value is for instance the number of the compartment on the liquid tank truck. Thus for sensors 1a-1e the addressing value to be allocated may be 1-5, respectively Upon receipt of the addressing signal with value 1 by the first sensor 1a, the first sensor 1a will store the addressing value '1' in the storage unit 3, and adapt the addressing value to a next addressing value for the second sensor by adding 1, thus resulting in addressing value '2'. Then, the first sensor 1a will transmit the addressing signal with the addressing value '2' from the pulse output connection of the first sensor 1a to the pulse input connection of the second sensor 1b.

The second sensor 1b will store the addressing value '2' in the storage unit 3, and adapt the addressing value '2' to a next addressing value '3' for the third sensor 1c. Subsequently, addressing values '3', '4' and '5' will, in the same manner, be assigned to the following sensors 1c, 1d and 1e, respectively.

Each time a sensor has been successfully addressed, the respective sensor will transmit an acknowledgement signal to the central processing unit 20 to acknowledge successful allocation of an addressing value to the respective sensor.

Once the sensors 1a-1e are allocated by assignment of an addressing value to each of the sensors 1a-1e data communication can be set up between the central processing unit 20 and each of the sensors 1a-1e.

For instance, when the central processing unit 20 would like to obtain the serial number of the third sensor, the central processing unit 20 will transmit a communication signal with a data request to provide the serial number and the addressing value, e.g. '3', of the third sensor 1c to the pulse input connection of the first sensor 1a.

Upon receipt of the communication signal by the first sensor 1a, the sensor processing unit of the first sensor 1a will compare its own addressing value, e.g. '1', with the addressing value of the communication signal, e.g. '3'. Since the addressing value of the communication signal and the stored addressing value do not correspond, the first sensor 1a will transmit the communication signal with the addressing value from its pulse output connection to the pulse input connection of the second sensor 1b.

Similarly, upon receipt of the communication signal by the second sensor 1b, the sensor processing unit of the second sensor 1b will compare its own addressing value, e.g. '2', with the addressing value of the communication signal, e.g. '3'. Since the addressing value of the communication signal and the stored addressing value of the second sensor 1b also do not correspond, the second sensor 1b will also transmit the communication signal with the addressing value from its pulse output connection to the pulse input connection of the third sensor 1b.

The third sensor 1c will also compare the addressing value of the communication signal with the addressing value of the third sensor 1c, e.g. '3'. Since the addressing value of the communication signal and the addressing value of the third sensor 1c correspond, the sensor 1c will recognize that the data request, in this case the data request to provide the serial number is directed to this sensor, and as a consequence, the sensor processing unit of the third sensor 1c will process the communication signal and transmit via the diagnostic line a data request response signal including the serial number of the third sensor 1c to the central processing unit 20.

The data request may also be a request for any other relevant information, such as the total number of times the sensor has detected liquid, maintenance data, sensor calibration data which was stored in the sensor after one or more calibrations, sensor location history, etc. The requested data may be real-time information or information stored in the sensor.

Instead of sending a data request to the sensor, the data communication between central processing unit 20 and one or more of the sensors 1a-1e, can also be used to send data to this sensor. For example, the communication signal may comprise sensor setting data, which can be sent to the sensor to change the settings of the sensor. The sensor setting data may comprise setting data to adjust sensitivity to ambient light or intensity of a light emitter of said sensor. Any other sensor setting may also be adjusted. Other data may also be sent to the sensor, such as calibration data, information on the compartment and the liquid tank truck on which the sensor is mounted, etc.

When data communication is finished, the sensors may be switched back to operational mode. To switch back to operational mode, the central processing unit 20 may send a mode switching signal to each of the sensors, or the sensor may be configured to switch back to operational mode after a certain period of time, for example a predetermined time interval after the last receipt of a communication signal by the sensor.

It may be desirable that in operational mode, it is also possible to receive data from the sensors 40a-40e, for instance status information. However, at the same time, it is undesirable that the request for data interferes with or interrupts the operational state of the sensor system.

In an embodiment, a characteristic of the pulse in operational mode can be used to address a specific sensor of the sensors 1a-1e, in particular when such characteristic is not used for operating the sensor system. For example, the frequency of the operation pulse can be changed within a certain bandwidth, without having any influence on the operational performance of the sensor system, in particular according to EN 13922 the frequency of an operational pulse signal may vary between 10 and 33 Hz. Since the frequency may vary without influencing the operating functionality of the sensor system, variation in the frequency can be used to request data from a selected one of the sensors 1a-1e.

The central processing unit 20 may be provided with a pulse generator capable of transmitting pulses with variable frequency. Predetermined frequencies may be associated with specific sensors of the sensors 1a-1e so that by using a specific predetermined frequency, a selected one of the sensors 1a-1e can be addressed and requested to send a data request response signal.

In the embodiment shown in FIG. 2, each of the sensors 1a-1e may be associated with a frequency of the operating pulse signal by using the integer value addressing value, as shown in the following table:

| Integer value addressing value | Frequency addressing value |
| --- | --- |
| 1 | 16.0 Hz |
| 2 | 15.3 Hz |
| 3 | 14.7 Hz |
| 4 | 14.0 Hz |
| 5 | 13.4 Hz |

Such table may be stored in the sensors 1a-1e so that each sensor 1a-1e is able to compare a frequency of the operating pulse signal received by the sensor with a frequency addressing value to determine whether the specific sensor is addressed by the central processing unit 20. In case the frequency of the operating pulse signal corresponds with a frequency addressing value of the sensor, the sensor is configured to transmit a data request response signal over the diagnostic connection 11 via the diagnostic line 32 to the central processing unit 20, while at the same time the operating pulse signals are used to detect whether one of the sensors detects a liquid.

The data request response signal may have several embodiments. In an embodiment, the data request response signal comprises a pointer value, requested data associated with the pointer value and a cyclic redundancy check (CRC).

The pointer value is a value that indicates what type of data is transmitted and the data is the actual data. The pointer value may run cyclic through a number of pointer values to cyclic transmit different types of data to the central processing unit 20. This means that each time a data request response signal is sent, the pointer value is changed to send another type of data. An example of pointer values and data is shown in the following table.

| Pointer value | Data | Type |
| --- | --- | --- |
| 1 | 01 | Compartment number |
| 2 | 50 | NON Sat |
| 3 | 21 | Temperature |
| 1 | 01 | Compartment number |
| 2 | 50 | NON Sat |
| Etc. | | |

For example, when a sensor, having three pointer values 1, 2 and 3 is addressed by a pulse response signal having the respective frequency associated with this sensor, the sensor may transmit over the diagnostic connection 11 the data request response signal comprising a pointer value 1 and a data value 01, meaning that the sensor is arranged in the compartment number 01. The next time the sensor will be addressed, the sensor will send the pointer value 2 and the associated data 50 relating to NON Sat, and the subsequent time the sensor will transmit the pointer value 3 and associated data 21. Since all pointer values then are used, the pointer value will go back to 1 and cyclically send the data associated with pointer values 1, 2 and 3. It will be clear that in practice the sensor may have any number of pointer values to send several data associated with each of the multiple pointer values.

In an alternative embodiment, in which no pointer value is used, the data sensor may transmit only one type of data each timer it is addressed, for example temperature, or multiple frequency addressing values may be associated with a single sensor, and for each frequency addressing value a specific type of data is transmitted to the central processing unit 20. FIG. 3 shows a set of five sensors 40a-40e connected in a 2-wire sensor arrangement in accordance with NEN-EN 13922. Each of the sensors 40a-40e is mounted in a compartment of a five compartment liquid tank truck (not shown), preferably at the bottom side of each compartment as part of a liquid overfill prevention system. The sensors 40a-40e may be used to determine whether a compartment is substantially empty before filling of a compartment is started.

The sensor arrangement is connected by a releasable connection 21, for example a 10-pin socket (EuroLINK) connection according to EN 13922, to a central processing unit 20.

In the 2-wire sensor arrangement each sensor 40a-40e is connected with its own power and pulse cable 41a-41e to the central processing unit 20, respectively. Further, all sensors 40a-40e are connected to a ground cable 42.

During normal operation wherein the sensors 40a-40e are configured to detect a liquid level in the tank compartment, there is no data communication between the central processing unit 20 and the sensors 40a-40e. In this normal operation the sensors are in operational mode, i.e. the sensors 40a-40e are configured to receive an operating signal sent by the central processing unit 20. Only when no liquid is detected by the sensors 40a-40e, the operating signal will be sent back to the processing unit 20 so that the central processing unit 20 can determine that the respective sensor does not detect any liquid.

To carry out data communication between the sensors 40a-40e and the central processing unit 20, the sensors 40a-40e are switched from operational mode to communication mode. In this communication mode, the sensors 40a-40e are configured and ready for data communication.

Since each sensor 40a-40e is connected to the central processing unit 20 with its own power and pulse cable, the central processing unit 20 can directly communicate with a selected sensor. Therefore, there is no need to use an addressing value in the communication signal. For example, when the central processing unit 20 would like to obtain the serial number of the third sensor 40c, the central processing unit 20 will transmit a communication signal with a data request to provide the serial number to the power and pulse input of the third sensor 40c. It is remarked that, when desired, an addressing value may be used in data communication with the sensors 40a-40e in the 2-wire arrangement.

Upon receipt of the communication signal by the third sensor 40c, the sensor processing unit of the third sensor 40c will process the communication signal and transmit a data request response signal including the serial number of the third sensor 40c to the central processing unit 20.

The data request may also be a request for any other relevant information, and instead of sending a data request to the sensor, the communication signal may also send data to the respective sensor. When data communication is finished, the sensors 40a-40e may be switched back to operational mode.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method of data communication with a selected sensor of multiple liquid level detection sensors connected to a central processing unit, the method comprising the steps of:
   a) transmitting by the central processing unit directly or indirectly a data communication signal to the selected sensor of the series of multiple sensors, and
   b) upon receipt of the communication signal by the selected sensor, processing the data communication signal in the selected sensor,
   wherein each sensor comprises a power input connection and a ground connection to provide power to the sensor, a pulse input connection, a pulse output connection and a diagnostic connection, wherein the multiple sensors are connected in series via the pulse input connection and the pulse output connection,
   wherein the multiple sensors are connected in parallel to the central processing unit via the diagnostic connection,
   wherein the communication signal is received at the pulse input connection and transmitted at the pulse output connection,
   wherein a data request response signal is transmitted at the diagnostic connection.

2. The method of claim 1, the method comprising the steps of:
   a) transmitting by the central processing unit a communication signal comprising an addressing value corresponding to an addressing value of the selected sensor to one or more of the series of multiple sensors,
   b) upon receipt of the communication signal by one of the multiple sensors,
   comparing by the respective one sensor the addressing value of the communication signal with an addressing value stored in the one sensor, and
   when the addressing value of the communication signal and the stored addressing value correspond, determining that the one sensor is the selected sensor and processing the communication signal in the selected sensor.

3. The method of claim 1, wherein the multiple liquid level detection sensors are connected in series to the central processing unit, the method comprising the steps of:
   a) transmitting by the central processing unit a communication signal comprising an addressing value corresponding to an addressing value of the selected sensor to the first sensor of the series of multiple sensors,
   b) upon receipt of the communication signal by one of the multiple sensors,
   comparing by the respective one sensor the addressing value of the communication signal with an addressing value stored in the one sensor, and
   when the addressing value of the communication signal and the stored addressing value correspond, determining that the one sensor is the selected sensor and processing the communication signal in the selected sensor, or
   when the addressing value of the communication signal and the stored addressing value do not correspond, transmitting the communication signal with the addressing value to a next sensor of the series of multiple sensors, c) repeating step b) until the communication signal is processed by the selected sensor.

4. The method of claim 1, wherein a sensor capable of data communication is switchable between an operational mode for operating the sensor and a communication mode for data communication with the central processing unit.

5. The method of claim 1, wherein the communication signal is transmitted over one or more cables used for operating signals.

6. The method of claim 1, wherein the multiple liquid level detection sensors are part of a liquid overfill prevention system for multi compartment liquid tank trucks, wherein each of the multiple liquid level detection sensors is arranged in a truck compartment.

7. The method of claim 1, wherein the communication signal comprises a data request, and wherein the step of processing the communication signal in the one sensor comprises sending a data request response signal to the central processing unit.

8. The method of claim 7, wherein the requested data is a serial number, the total number of times the sensor has detected liquid, operational data, maintenance data, sensor calibration data, sensor location history, or a maintenance interval counter.

9. The method of claim 1, wherein the communication signal comprises sensor setting data, and wherein the step of processing the communication signal in the one sensor comprises storing the sensor setting data in the one sensor.

10. The method of claim 9, wherein the sensor setting data comprises setting data to adjust sensitivity to ambient light, intensity of a light emitter of said sensor, or sensor location.

11. A method of data communication with a selected sensor of multiple liquid level detection sensors connected to a central processing unit, the method comprising the steps of:
   a) transmitting by the central processing unit directly or indirectly a data communication signal to the selected sensor of the series of multiple sensors,
   b) upon receipt of the communication signal by the selected sensor, processing the data communication signal in the selected sensor, and
   c) allocating an addressing value to one or more of the multiple sensors to determine a location of the one or more sensors in the series of multiple sensors,
   wherein the step of allocating an addressing value to one or more of the multiple sensors comprises:
   d) transmitting by the central processing unit an addressing signal having an addressing value to a first sensor of the series of multiple sensors,
   e) upon receipt of the addressing signal by one of the multiple sensors, by the respective one sensor,
      adapting the addressing value to a further addressing value,
      storing the addressing value or the further addressing value in the sensor,
      transmitting the addressing signal with the further addressing value to a next sensor of the series of multiple sensors, and
      transmitting an acknowledgement signal to the central processing unit to acknowledge receipt and/or transmission of the addressing signal, and
   f) repeating step e) for each sensor receiving the addressing signal and capable of data communication wherein each sensor comprises a power input connection and a ground connection to provide power to the sensor, a pulse input connection, a pulse output connection and a diagnostic connection, wherein the multiple sensors are connected in series via the pulse input connection and the pulse output connection, and wherein the multiple sensors are connected in parallel to the central processing unit via the diagnostic connection, and wherein the addressing signal is received at the pulse input connection and transmitted at the pulse output connection, and wherein the acknowledgement signal is transmitted at the diagnostic connection.

12. The method of claim 11, wherein the addressing value is an integer value, and wherein the step of adapting the addressing value comprises adding a fixed number to the integer value.

13. The method of claim 11, comprising the step of counting by the central processing unit the number of received acknowledgement signals representing the number of successfully addressed sensors.

14. A method of data communication with a selected sensor of multiple liquid level detection sensors connected to a central processing unit, the method comprising the steps of:
   a) transmitting by the central processing unit directly or indirectly a data communication signal to the selected sensor of the series of multiple sensors,
   b) upon receipt of the communication signal by the selected sensor, processing the data communication signal in the selected sensor, and
   further comprising the step of counting the number of sensors in a series of multiple sensors capable of data communication, the counting comprising:
   i) transmitting by the central processing unit or the first sensor a counting signal to a sensor of the series of multiple sensors,
   ii) upon receipt of the counting signal by one of the multiple sensors, by the respective one sensor, transmitting the counting signal to a next sensor of the series of multiple sensors and transmitting an acknowledgement signal to the central processing unit, wherein the sensors capable of data communication are configured to transmit the counting signal and the acknowledgement signal with a delay,
   iii) repeating step ii) for each sensor receiving the counting signal, and
   iv) determining by the central processing unit on the basis of the number and timing of acknowledgement signals received by the central processing unit, the number of sensors capable of data communication in the series of multiple sensors.

15. The method of claim 1, wherein the communication signal is an operating pulse signal having a variable characteristic, in particular the frequency of the operating pulse signal, wherein a value of the variable characteristic is used as an addressing value to address a specific one of multiple sensors to request a data request response signal of this specific one sensor.

16. The method of claim 1, wherein the sensor is configured to send a data request response signal in response to the communication signal over the diagnostic connection.

17. The method of claim 16, wherein the data request response signal comprises a pointer value, requested data associated with the pointer value and a cyclic redundancy check (CRC).

18. A liquid level detection system, in particular a liquid overfill prevention system for multi compartment liquid tank trucks, comprising two or more liquid level detection sensors, preferably arranged in series, and a central processing unit, wherein at least one of the two or more sensors comprises a sensor processing unit comprising a storage unit, wherein the central processing unit and the sensor processing units are configured to perform the method of claim 1.

19. The liquid level detection system of claim 18, wherein the central processing unit comprises a pulse generator for generating an operating pulse signal having a variable characteristic, wherein a value of said characteristic can be adjusted by said pulse generator.

20. Optical liquid level detection sensor comprising a sensor processing unit, wherein said sensor processing unit is configured to carry out the method of claim 1.

21. A method of operating multiple liquid level detection sensors, in particular multiple liquid level detection sensors of a liquid overfill prevention system of a multi compartment liquid tank truck, comprising the steps of:
    connecting the sensors to a central processing unit,
    sending from the central processing unit directly or indirectly an operating signal to the sensors to determine if at least one of the sensors is in contact with liquid, and
    carrying out a data communication method according to claim 1.

22. A computer program adapted to perform the method of claim 1.

* * * * *